(12) United States Patent
Marshall (10) Patent No.: US 6,262,851 B1
(45) Date of Patent: Jul. 17, 2001

(54) DOUBLE-PASS PROJECTION DISPLAYS WITH SEPARATE POLARIZERS AND ANALYZERS

(75) Inventor: Daniel R. Marshall, Boise, ID (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/488,389

(22) Filed: Jan. 18, 2000

(51) Int. Cl.[7] ................... G02B 27/14; G02B 27/12; G03B 21/14; G03B 21/26; G02F 1/1335

(52) U.S. Cl. ................... 359/634; 359/636; 359/640; 353/20; 353/31; 353/33; 353/34; 349/5; 349/8; 349/9

(58) Field of Search ............... 349/5, 8, 9; 348/756, 348/757; 353/31, 33, 34, 20, 81; 359/246, 259, 263, 485, 490, 502, 634, 636, 638, 639, 640

(56) References Cited

U.S. PATENT DOCUMENTS

| | | | |
|---|---|---|---|
| 4,911,547 | * | 3/1990 | Ledebuhr ................ 353/31 |
| 5,420,655 | * | 5/1995 | Shimizu ................. 353/33 |
| 5,621,486 | * | 4/1997 | Doany et al. ............ 348/756 |
| 5,644,432 | * | 7/1997 | Doany ................... 359/634 |
| 5,914,817 | * | 6/1999 | Browning et al. ......... 359/634 |
| 5,986,815 | * | 10/1999 | Bryars ................. 359/634 |
| 6,005,722 | * | 12/1999 | Butterworth et al. ...... 359/712 |

\* cited by examiner

Primary Examiner—Georgia Epps
Assistant Examiner—David N. Spector (57) ABSTRACT

A double-pass projection display system with separate polarizers and analyzers. One embodiment of the invention includes an input polarizer, a color separation/recombination device, and a number of image producing sections. The input polarizer receives unpolarized white light and polarizes this light. The color separation/recombination device receives the polarized white light and separates this light into a number of component color bands. The color separation/recombination device then supplies a component color band to each image producing sections. Each section includes a spatial light modulator and an output analyzer. The spatial light modulator modulates the color band that the image producing section receives from the color separation/recombination device. The output analyzer then (1) discards the light, in the modulated band, that has a first polarization state, and (2) directs the light, in the modulated band, that has a second polarization state to the color separation/recombination device. The color separation/recombination device then produces a single color light by combining the component color bands that it receives from the output analyzers of the image producing sections.

13 Claims, 7 Drawing Sheets

DOUBLE-PASS PROJECTION DISPLAYS WITH SEPARATE POLARIZERS AND ANALYZERS

BACKGROUND OF THE INVENTION

To date, a variety of optical projection systems have been proposed. Each of these display systems typically includes (1) an input polarizer, (2) one or more spatial light modulators, and (3) one or more output analyzers. An input polarizer linearly polarizes unpolarized light. One type of input polarizer is a polarizing beam splitter ("PBS"), which polarizes unpolarized light by splitting it into transmitted P-polarized light and reflected S-polarized light. P-polarized light is light that is parallel to the plane of incidence (which is defined by the incident and reflected rays), while S-polarized light is light that is perpendicular to the plane of incidence.

A spatial light modulator (SLM) receives the light that an input polarizer linearly polarizes. An SLM often includes an array of picture elements (also called pixels) that the SLM individually controls to modulate the light passing through the pixels. An SLM is typically formed by positioning a layer of liquid crystal material between two electrodes. One of the electrodes is segmented into an array of pixel electrodes to define the pixels of the SLM, while the other electrode is usually not segmented.

There are two varieties of SLM's: reflective and transmissive. In both varieties, the direction of an electric field applied between each pixel electrode and the other electrode determines whether the corresponding pixel changes the polarization of light falling on the pixel. Hence, in both varieties, the incident light is modulated by changing the polarization of light falling on certain pixels while leaving unchanged the polarization of the light falling on other pixels.

An output analyzer receives the light transmitted or reflected by an SLM. Output analyzers are polarization-selective devices similar to the input polarizers. Polarizing filters and PBS's are two types of output analyzers. An output analyzer allows a certain polarization state of the light to pass, while discarding the remaining polarization states. Hence, output analyzers are placed at the outputs of SLM's to obtain the pattern of modulation of the SLM's, and thereby generate images. An observer will not perceive an image unless an analyzer follows an SLM, because the SLM does not attenuate the incident beam of light, but rather simply modulates the lights polarization state.

Projection displays generate color images by modulating, analyzing, and combining component color bands. Display devices typically use a few component colors (such as the primary additive colors, red, green or blue) to generate a multitude of colors for display. A component color band is a portion of the light spectrum corresponding to a component color. When all the component color bands are added, they produce white light. Conversely, component color bands can be extracted from white light.

To generate color images, projection displays not only use input polarizers, SLM's, and output analyzers, but they also use other devices. For instance, color projection systems often either use (1) a light source for each component color band (e.g., three light sources for the three primary additive colors, red, green, and blue), or (2) a single source of white light with a prism or other color separation device that separates incident white light into component color bands (e.g., into red, green, and blue light).

The component color bands are then used to illuminate one or more SLM's, which modulate the incident light for each color band. The modulated color bands are then recombined to produce a full-color image. The recombination may take place sequentially or simultaneously.

I. Color-Field Sequential Display Systems.

Figure 1:
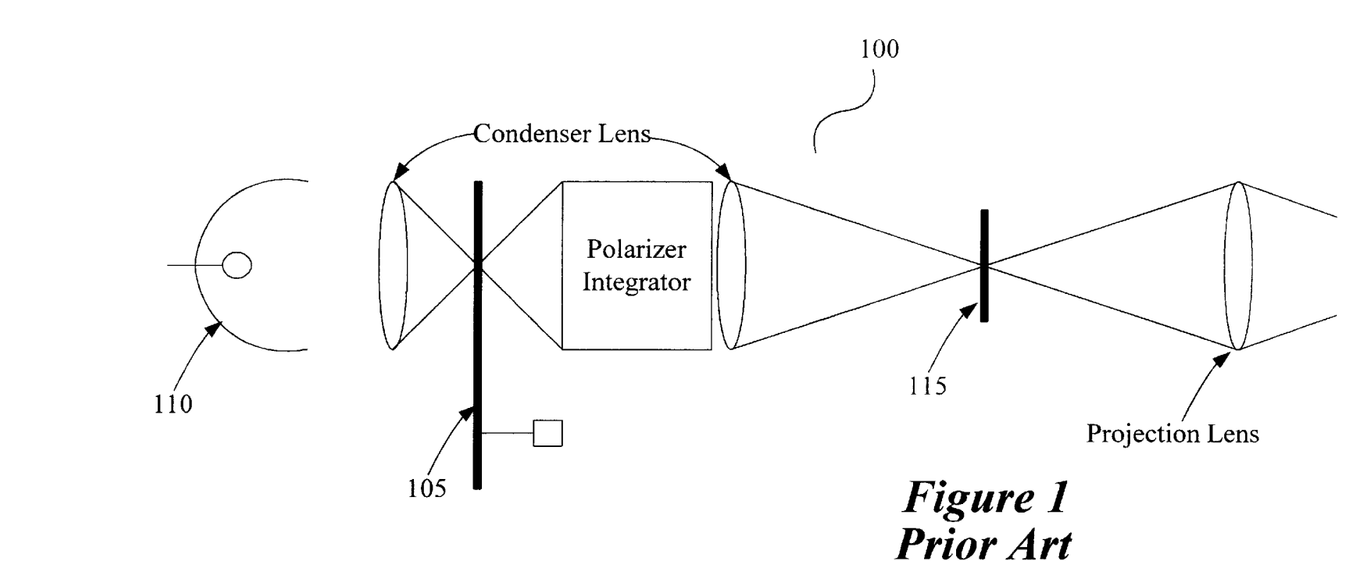
FIG. 1 presents a prior art color-field sequential display system.

Color-field sequential systems create an image by sequentially projecting red ("R"), green ("G"), and blue ("B") images. FIG. 1 presents one prior art color-field sequential system. This display system 100 uses a mechanical color filter wheel 105 positioned between a light source 110 and a light valve 115 (which includes an SLM and an analyzer).

Figure 2:
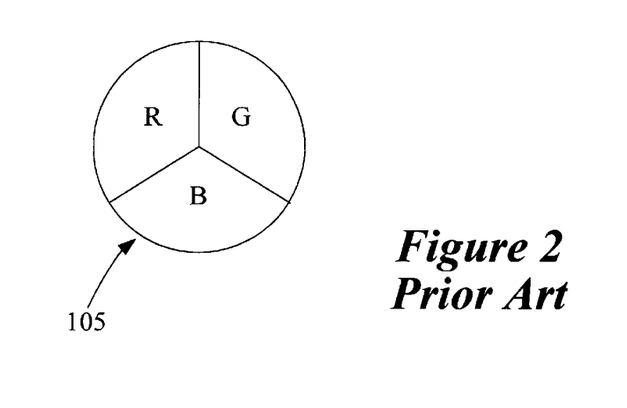
FIG. 2 presents a frontal view of a mechanical filter wheel used in the display system of FIG. 1.

As shown in FIG. 2, the filter wheel 105 is divided into three filter sections, each acting as a pass filter for one of the three primary additive colors. By rotating the filter wheel, successive red, green, and blue light are generated to illuminate the light valve. The light valve is then modulated to generate successive red, green, and blue images. The eye-brain system fuses the successively-projected color images into a single blended polychromatic image, if the eye is stationary and the successive color patterns are projected at a high rate.

The eye, however, is not always stationary and often moves, and this movement can cause the viewer to see artifacts, called color sequential artifacts ("CSA"). For instance, the viewer might see spurious images (such as flashes of red, green, or blue light). CSAs are not only annoying, but also present safety concerns (e.g., they may cause epileptic attacks).

Increasing the projection rate of the images can minimize color sequential artifacts. However, at high rates, the mechanical color filter 105 does not operate reliably and introduces noise and vibration into the system. Electronic color switches can be used in place of the mechanical filter 105, but the electronic switches require complicated processing and driving circuitry, and are somewhat inefficient at their high switching rates. Finally, sequential system 100 does not generate good color contrast because its light valve 115 cannot be cost-effectively designed to operate perfectly for each of the three generated color bands.

II. Simultaneous Projection Display Systems.

Simultaneous projection display systems create a color image by optically superimposing multiple partial-color images to the same location. In addition to using light sources, input polarizers, color-separating devices, SLM's, and output analyzers, simultaneous projection systems also use color-recombining devices (such as dichroic prisms) to recombine each of the component color images in a coordinated way.

Simultaneous projection systems may be divided into single-pass and double-pass systems. Double-pass systems use the same device for both the color separation and recombination operations, while single-pass systems use different devices for these operations.

A. Single-Pass Systems.

Figure 3:
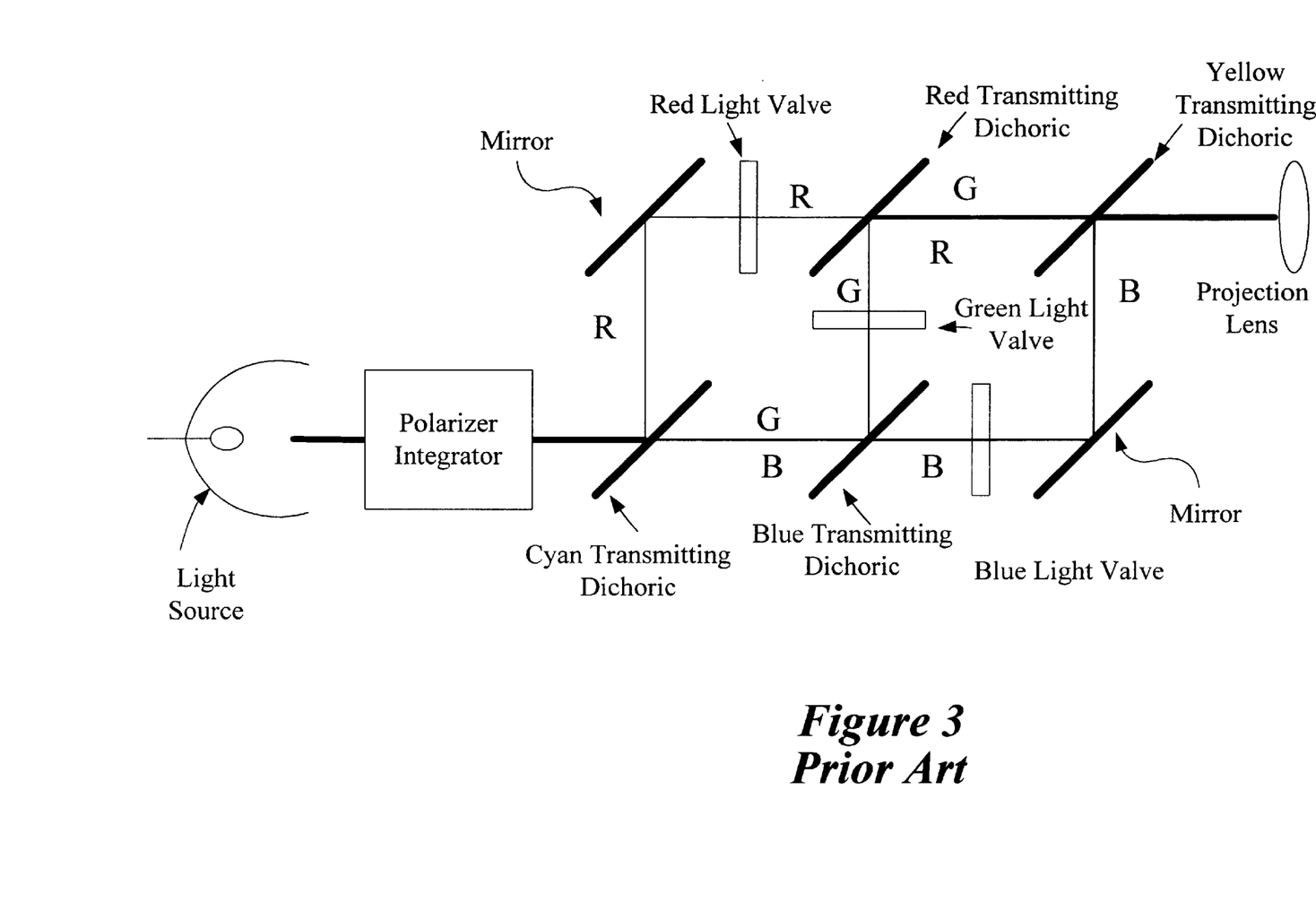
FIG. 3 presents a prior art single-pass display system.

FIG. 3 presents one prior art single pass system. The light from the light source is separated into three color bands using dichroic filters. A separate light valve (formed by an SLM and an output analyzer) modulates each color band. The modulated color bands are then recombined using dichroic filters.

There are several disadvantages to this architecture. For example, this system is somewhat bulky and relatively expensive since it uses many components. Also, its projection lens is complex and costly since it needs a projection lens with large back-focal length due to the relatively large distance from the panel to the lens. The dichroic filters used for the recombination operations also introduce aberrations and distortion in the generated images.

Figure 4:
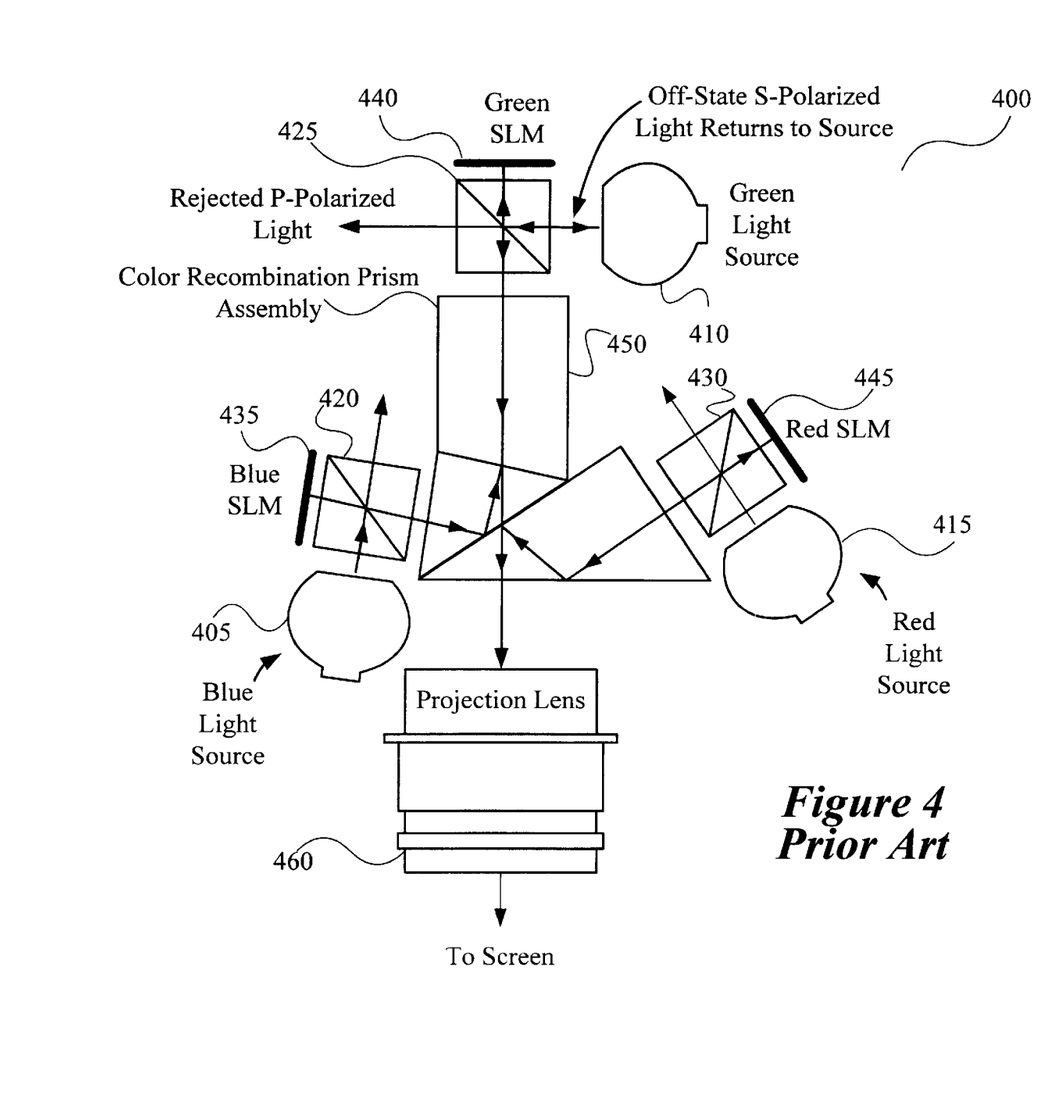
FIG. 4 presents another prior art single-pass display system.

FIG. 4 presents another prior art single-pass system. This system receives R, G, and B light either from three sources of light (as shown in FIG. 4), or from a color-separator (not shown) that separates these different color bands from white light. System 400 also utilizes three PBS's 420, 425, and 430. These PBS's serve as input and output polarizers. Specifically, the PBS's initially receive unpolarized light from light sources 405, 410, and 415. They transmit the P-polarized light out of the system, while reflecting the S-polarized light towards the SLM's 435, 440, and 445.

The SLM's then modulate and reflect the received light back to the PBS. On the second pass through, the PBS's serve as output polarizers (i.e., output analyzers). The analyzers (1) reflect and thereby reject the S-polarized light (corresponding to the light having a polarization that the SLM's did not change), and (2) transmit the P-polarized light (corresponding to the light having a polarization that the SLM's changed). The dichroic prism 450 receives the color images output from the analyzers and combines these images into a single polychromatic image. Projection lens 460 then projects this image on a screen.

The design and construction constraints on this system are considerably relaxed because each pair of PBS's and SLM's is tightly coupled and operates over a narrow color spectrum. Also, the recombination prism does not convert the polarization of the light because the light passing through it only has a single polarization orientation—in this case, P-polarized.

This system, however, uses many components. For instance, it either needs three different light sources, or it needs a color-separating device different than the recombination prism. As a result, this system is somewhat bulky and relatively expensive.

B. Double-Pass Systems.

Unlike single-pass systems, double-pass systems use one device (e.g., one dichroic prism) for both the color separation and recombination operations. Hence, double-pass systems are typically smaller and less expensive.

Figure 5:
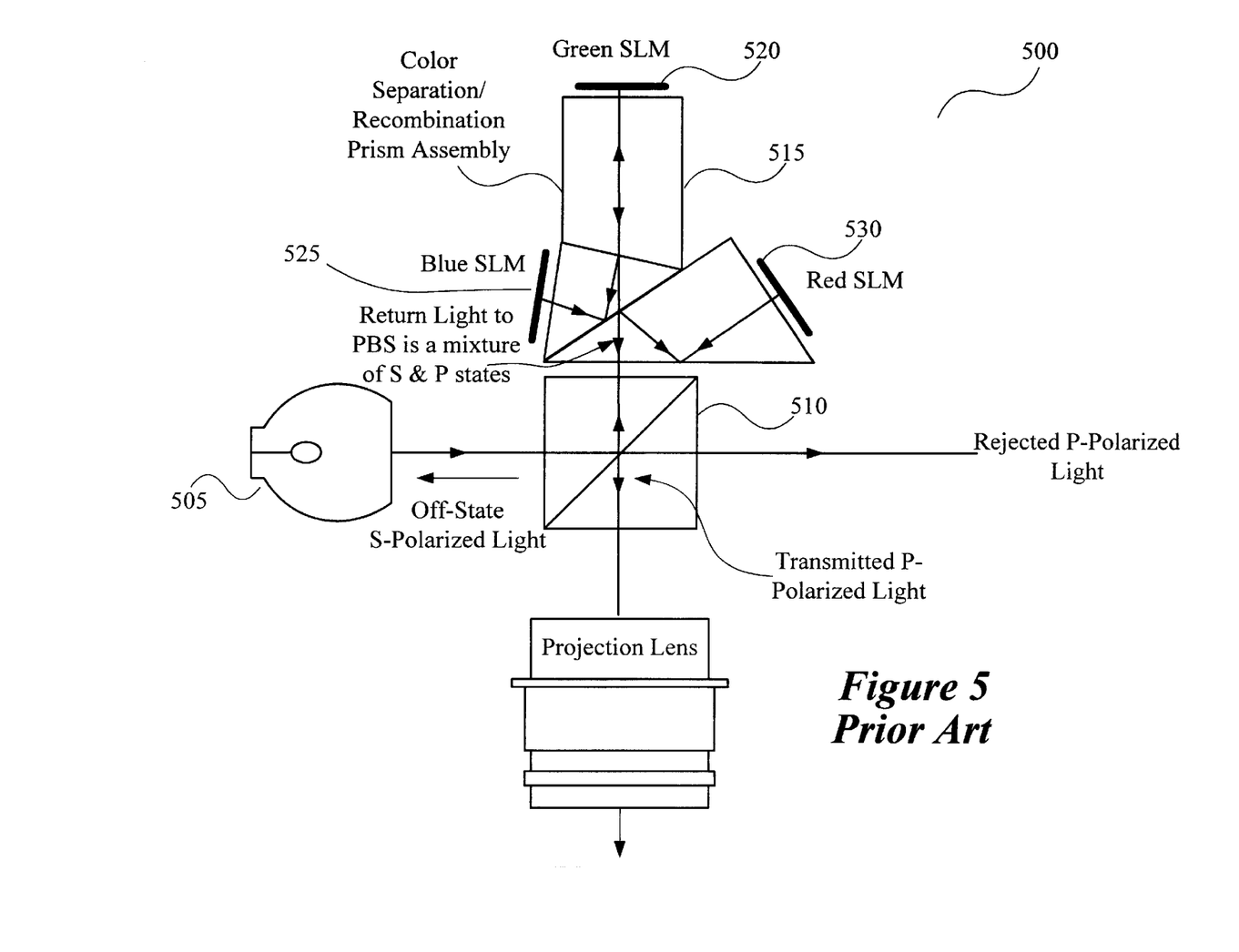
FIG. 5 presents a prior art double-pass display system.

FIG. 5 presents one prior art double-pass projection display system. This system 500 includes a light source 505, a PBS 510, a prism 515, and three SLM's 520, 525, and 530. The light source 505 supplies unpolarized light to the PBS 510. This PBS serves as both the input polarizer and the output analyzer. As the input polarizer, the PBS polarizes the unpolarized white light that it receives from the light source 505 by transmitting P-polarized light out of the system (and thereby discarding this polarization), while reflecting S-polarized light towards the prism.

The dichroic prism 515 then separates the S-polarized white light into its color components, and directs each color light to the corresponding color SLM. The SLM's then modulate and reflect the received light. The reflected light includes both S-polarized light (corresponding to light having a polarization that the SLM's did not change) and P-polarized light (corresponding to light having a polarization that the SLM's changed).

The light reflected by the SLM's then enters the prism, which now combines the modulated color light and supplies the combined light to the PBS. On the second pass through, the PBS serves as the output analyzer that (1) reflects and thereby rejects the S-polarized light, and (2) transmits the P-polarized light. The projection lens then receives the P-polarized light from the analyzer and focuses this light on the screen.

The design and construction constraints on this system are considerable because the PBS operates as the analyzer for all three-color bands, and therefore must meet exacting performance requirements over the entire color spectrum. It is quite difficult to have the PBS perform optimally over the entire color spectrum. The PBS typically is optimized for one or two of the additive colors, which causes the PBS to offer poor contrast and poor dark states for the third additive color.

A high degree of scattered light also exists in the dichroic prism because all the light reflected by the SLM's is directed through the prism. This, in turn, increases the performance requirements on the prism. In addition, the light passing through the prism has both S and P polarization. This causes the prism to introduce polarization conversion. Specifically, when both S and P light traverse through the prism, the prism rotates the polarization of the S and P light and/or introduces ellipticity into the polarization state.

Polarization conversion then contaminates the analyzing operation performed by the PBS on the second pass. For instance, if the polarization conversion causes S-polarized light from a pixel (an "OFF" or dark pixel) to slightly rotate so that it now has a P-polarized component, then the PBS on the second pass does not reject all the light for that pixel and allows the P-polarization component to pass. Hence, the polarization conversion causes light to leak into the dark pixels and reduces the contrast and brightness of the bright pixels.

Therefore, there is a need in the art for a double-pass system that generates good dark states and good color contrast. There is also a need for a double-pass system that avoids leakage of light into dark pixels. The double-pass system should also ideally have analyzers that operate over narrower bands and closely couple to their respective SLM's.

SUMMARY OF THE INVENTION

This invention is directed towards double-pass projection displays with separate polarizers and analyzers. One embodiment of the invention includes an input polarizer, a color separation/recombination device, and a number of image producing sections. The input polarizer receives unpolarized white light and polarizes this light. The color separation/recombination device receives the polarized white light and separates this light into a number of component color bands.

The color separation recombination device then supplies a component color band to each image producing sections. Each section includes a spatial light modulator and an output analyzer. The spatial light modulator modulates the color band that the image producing section receives from the color separation/recombination device. The output analyzer then (1) discards the light, in the modulated band, that has a first polarization state, and (2) directs the light, in the modulated band, that has a second polarization state to the color separation/recombination device. The color separation/recombination device then produces a single color light by combining the component color bands that it receives from the output analyzers of the image producing sections.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

This invention is directed towards double-pass projection displays with separate polarizers and analyzers. In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Figure 6:
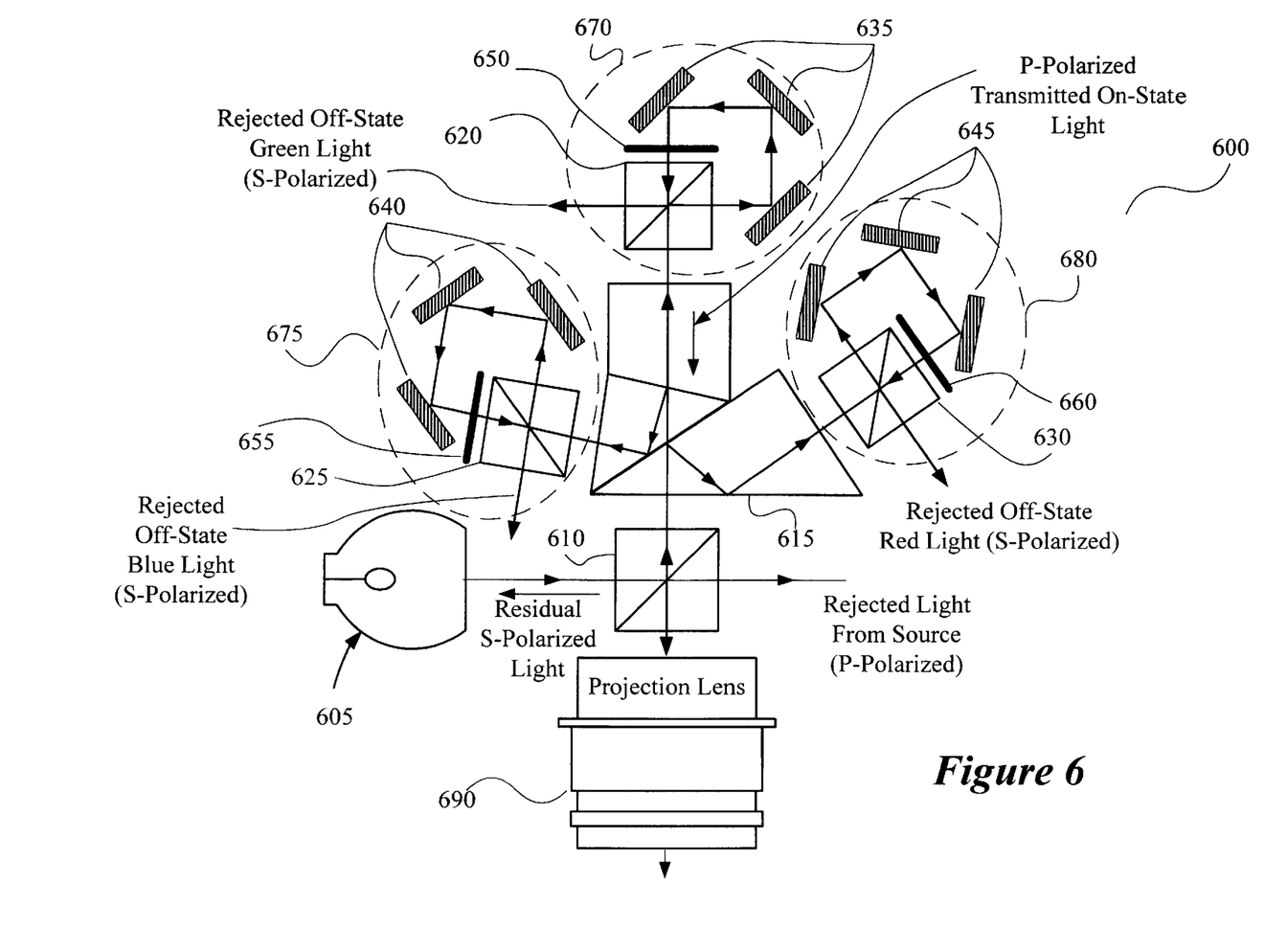
FIG. 6 presents one embodiment of the invention.

FIG. 6 presents one embodiment of the invention. This embodiment is a double-pass projection display system 600. This display system includes (1) a light source 605, (2) an input polarizer 610, (3) a color separation/recombination device 615, and (4) three image-producing sections 670, 675, and 680. Each image producing section pairs one output analyzer (620, 625, or 630) with one transmissive SLM (650, 655, or 660) to produce an image for a green, blue, or red component color. Each image producing section also includes one set of mirrors (635, 640, or 645).

The light source 605 initially supplies unpolarized light to the input polarizer 610. In the embodiment shown in FIG. 6, the input polarizer is a PBS, such as a MacNeille polarizing cube. Other embodiments utilize different input polarizers. The PBS polarizes the unpolarized light that it receives from the light source 605 by allowing the P-polarized light to pass through it and out of the system (and thereby discarding this polarization component of the light). The PBS 610 reflects the remaining S-polarized light towards the color separation/recombination device 615.

Figure 8:
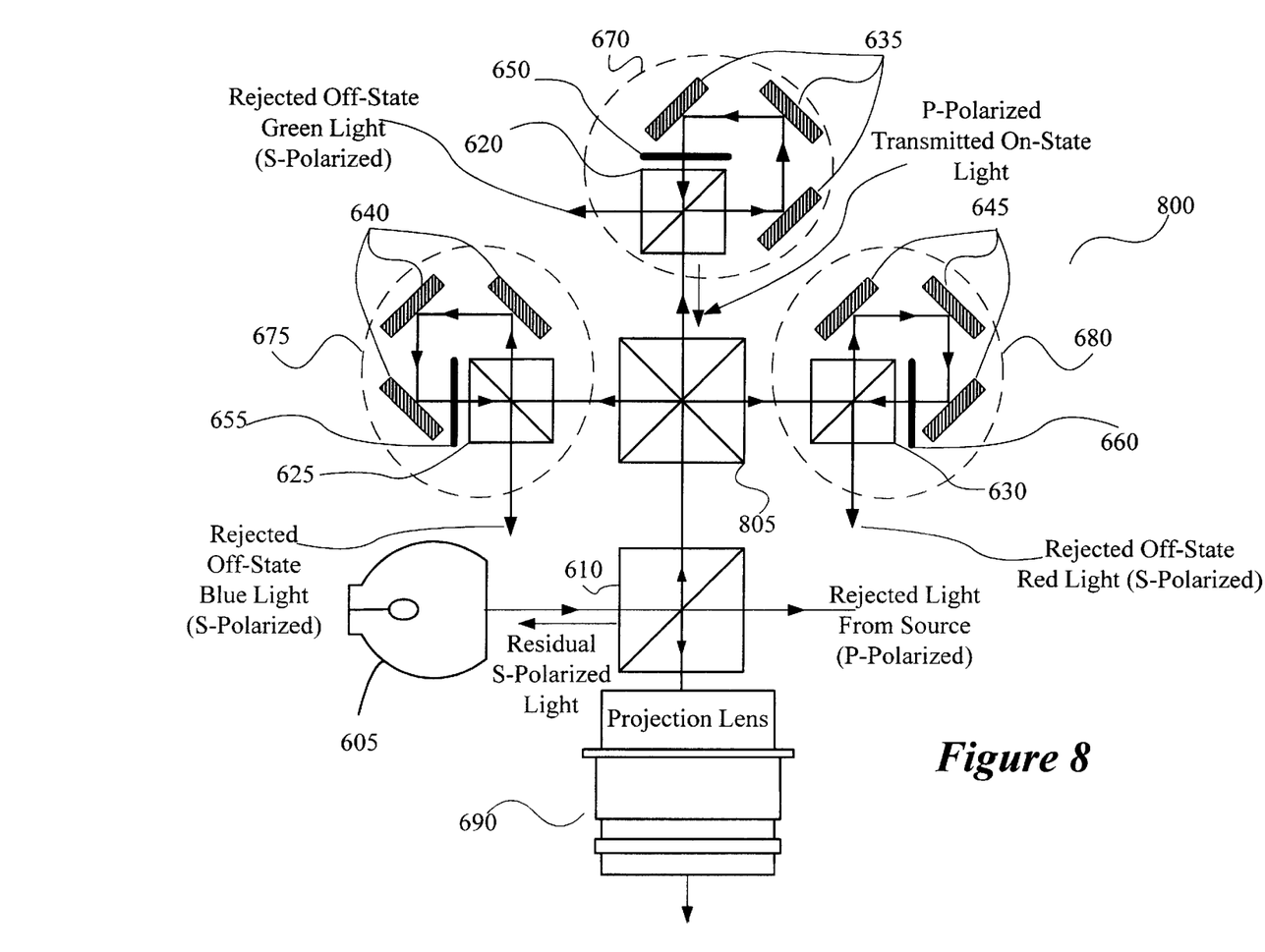
FIG. 8 presents another embodiment of invention using a dichroic cube.

The color separation/recombination device is a dichroic prism 615 (such as a Philips prism) in the embodiment shown in FIG. 6. Other embodiments of the invention, however, use different color separation/recombination devices. For example, as shown in FIG. 8, one embodiment of the invention uses a dichroic cube 805 (such as the X-cube manufactured by Balzers, Inc). A dichroic cube can be used to implement the invention because the invention ensures that only one polarization is transmitted in a particular direction through the color separation/recombination device, and this is a precondition for using dichroic cubes.

The dichroic prism 615 separates the S-polarized white light that it receives into component red, green, and blue light. The prism directs the green color light to output analyzer 620, the blue color light to output analyzer 625, and the red color light to output analyzer 630.

In the embodiment shown in FIG. 6, the output analyzers are PBS's that are similar to PBS 610. Other embodiments, however, use different analyzing devices. PBS's 620, 625, and 630 reflect their respective incident S-polarized component light to mirrors 635, 640, and 645 respectively. These mirrors then reflect and direct the light to pass through the transmissive SLM's 650, 655, and 660.

Each SLM modulates its incident S-polarized component light by changing the S-polarization of light passing through a first set of pixels (the "ON" pixels) to a P-polarization, while leaving the S-polarized light passing through a second set of pixels (the "OFF" pixels) unchanged. In some embodiments of the invention, the SLM's 650, 655, and 660 are formed by (1) placing a layer of liquid crystal material (such as surface-stabilized ferroelectric liquid crystal (SSFLC)) between two electrodes, and (2) segmenting one of the electrodes into an array of pixels electrodes that define the pixels of the SLM. Other embodiments of the invention use different liquid crystal materials, different electrode structures, and/or different SLM's.

The electric field applied between each pixel electrode and the other electrode, in conjunction with the structure and orientation of the SLM's liquid crystal material, determine how each pixel rotates the polarization of light falling on it. In the embodiment shown in FIG. 6, SLM's 650, 655, and 660 are structured as half-wave plates because light passes through them only once.

In addition, the orientation of the each half-wave plate with respect to the polarization of the incident light is chosen to provide an optical phase shift of 90° when the appropriate potential difference exists between the pixel electrode and the transparent electrode. An optical phase shift of 90° changes the incident S-polarized light to P-polarized light. Hence, each SLM modulates its component-color light by changing the polarization state of certain regions in this light (i.e., rotating light falling on a first set of "ON" pixels of the SLM) while leaving unchanged the polarization state of other regions in the light (i.e., not rotating light falling on a second set of "OFF" pixels of the SLM).

Output analyzers 620, 625, and 630 then (1) receive their modulated, component-color light from their respective SLM's 650, 655, and 660, and (2) create component color images by filtering out (i.e., rejecting) the S-polarized light from their component color light. More specifically, the output analyzers receive P-polarized light from the "ON" pixels of the SLM's, and S-polarized light from the "OFF" pixels of the SLM's. The "ON-state" P-polarized light passes through the output analyzers and into the color separation/recombination prism, while the "OFF-state" S-polarized light reflects off the output analyzers and out of the system. Hence, the output analyzers discard the S-polarized light to create dark regions in the component color light, which correspond to the "OFF" state pixels. By creating these dark regions in their component color light, the output analyzers 620, 625, and 630 create color images respectively for their green, blue, and red color bands.

The dichroic prism 615 receives the component color images output from the analyzers (i.e., receives the "ON-state" P-polarized component color light from the analyzers). On the second pass through, the prism serves as a color recombination device that superimposes and combines the received P-polarized green, blue, and red light to generate a full-color image.

The prism then directs the combined color light to PBS 610. On the second pass through, the PBS 610 acts as an auxiliary or "clean-up" analyzer that reflects and thereby rejects any S-polarized light that might have leaked through analyzers 620, 625, and 630 and/or might have inadvertently been created in the prism 615. The PBS 610 then transmits the P-polarized light to the projection lens 690, which focuses this light on the screen.

Projection display system 600 has numerous advantages. This system provides the superior image quality of a single pass system with the compactness, robustness and low cost of a double-pass system. Double-pass system 600 is small and relatively inexpensive because it uses one device for both the color separation and color recombination operations.

This system also limits the polarization of light flowing through the color separation/recombination device 615 to a single polarization in each direction of flow. The light flowing from the PBS 610 to the output analyzers 620, 625, and 630 is only S-polarized, while the light flowing from the output analyzers 620, 625, and 630 to the PBS 610 is P-polarized.

Limiting the light flowing through the prism 615 to a single polarization in each direction has a number of advantages. It enables display 600 to use a dichroic cube as the color separation/recombination device. It also significantly relaxes the design constraints on the separation/recombination device, because the separation/recombination device 615 does not need to preserve the phase relationship between the S and P polarized components.

Limiting the light flow to a single polarization also prevents the prism from introducing unwanted polarization conversion. Preventing polarization conversion improves image quality. Specifically, prior art color recombination devices suffer from polarization conversion, which causes light to leak into the dark pixels and reduces the contrast and brightness of the bright pixels. By preventing polarization conversion from occurring in color recombination device 615, system 600 enjoys superior dark states and color contrast.

In addition, each output analyzer in system 600 operates over a narrow band. Hence, each output analyzer can be specifically designed to operate perfectly over its targeted narrow band. Each output analyzer also tightly couples to an SLM. This tight coupling in conjunction with the narrow band operation of the output analyzer allow the image-producing sections to generate sharp "ON" and "OFF" states.

System 600 is also advantageous because it minimizes the amount of light flowing through the color recombination device. Reducing the total amount of light in the color recombination device reduces scattered light, thus improving the contrast of the image. It accomplishes this because the output analyzers discard the unused "OFF" state S-polarized light.

Mirror assemblies 635, 640, and 645 are also beneficial because they allow the display system to operate even when the polarization states are inverted. In other words, if the position of the projection lens and the light source were swapped, and PBS 610 directed P-polarized light towards prism 615, the mirror assemblies would enable the display system 600 to continue operating. The only difference would be that the "ON" polarized light (directed by the output analyzers back into the prism) would be S-polarized light.

Figure 7:
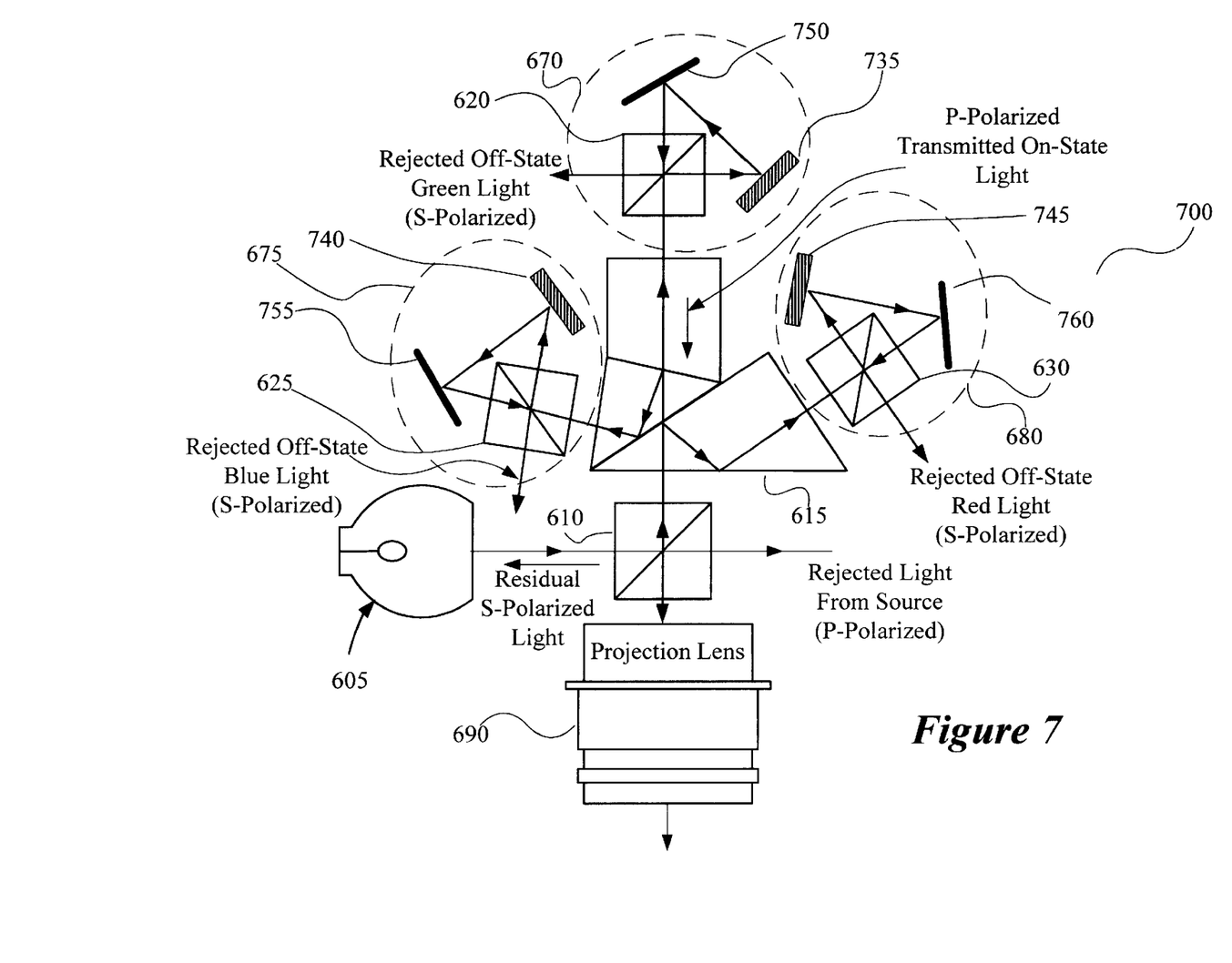
FIG. 7 presents another embodiment of the invention.

FIG. 7 presents another embodiment of the invention. Double-pass projection system 700 is analogous to projection system 600 of FIG. 6, except that system 700 (1) uses reflective SLM's rather than the transmissive SLM's of system 600, and (2) uses only one mirror (735, 740, or 745) to direct the light between each pair of output analyzer and SLM. Consequently, the discussion above regarding the operation of the light source 605, the input polarizer 610, the color separation/recombination device 615, and the output analyzers 620, 625, and 630 in system 600, is equally applicable to the operation of these devices in system 700.

The structure and operation of reflective SLM's 735, 740, and 745 will now be described. In some embodiments of the invention, each SLM is composed of a layer of a liquid crystal material (such as SSFLC) positioned between two electrodes. The first electrode is a transparent electrode, while the second electrode is a reflective electrode. Other embodiments of the invention use different liquid crystal materials, different electrode structures, and/or different SLM's.

The reflective electrode is divided into a two-dimensional array of pixel electrodes that define the pixels of the SLM. Each pixel electrode reflects the portion of the incident polarized light that falls on the pixel electrode towards the SLM's corresponding output analyzer. The potential difference between the pixel electrode and the transparent electrode establishes an electric field across the part of the liquid crystal layer between the pixel and transparent electrodes. The electric field applied between each pixel electrode and the other electrode, in conjunction with the structure and orientation of the SLM's liquid crystal material, determine how each pixel rotates the polarization of light falling on it.

The reflective SLM is structured as a quarter-wave plate because light passes through the reflective SLM twice, once before and once after the reflection. The orientation of the quarter-wave plate with respect to the polarization of the incident light is chosen to provide a double-pass optical phase shift of 90° when the appropriate potential difference exists between the pixel electrode and the transparent electrode.

As mentioned above, system 700 operates analogously to system 600, with the exception of the reflective SLM's and their corresponding mirror assemblies. System 700 also enjoys the same advantages as system 600. Consequently, the analogous operations and advantages are not repeated below in order not to obscure the description of the invention with unnecessary detail.

While the invention has been described by reference to numerous specific details, one of ordinary skill in the art will recognize that the invention can be embodied in other specific forms without departing from the spirit of the invention. For instance, the embodiments described above separate white light into the red, green, and blue component color bands. Other embodiments of the invention, however, utilize different component color bands.

In addition, the SLM's of systems 600 and 700 change the polarization of the light falling on the "ON" state pixels while they leave the polarization of the light falling on the "OFF" state pixels unchanged. The SLM's of other embodiments of the invention, however, use different conventions in order to modulate the light. Thus, one of ordinary skill in the art would understand that the invention is not to be limited by the foregoing illustrative details, but rather is to be defined by the appended claims.

I claim:

1. A double-pass projection display comprising:

a spatial light modulator, a color separation/recombination device, and an output analyzer positioned between the spatial light modulator and the color separation/recombination device.

2. The double-pass projection display of claim 1, wherein, during the operation of the double-pass projection display, the spatial light modulator receives polarized light and modulates the polarization of the received polarized light;

the output analyzer receives the light modulated by the spatial light modulator, and discards the modulated light that has a first polarization state; and the color separation/recombination device receives from the output analyzer the modulated light that has a second polarization state.

3. The double-pass projection display of claim 2 further comprising an input polarizer separate from the output analyzer, wherein, during the operation of the double-pass projection display, the input polarizer receives unpolarized light and changes the received unpolarized light to the polarized light.

4. The double-pass projection display of claim 3,
   wherein the polarized light is polarized white light, and
   wherein, during the operation of the double-pass projection display, the color separation/recombination device receives the polarized white light from the input polarizer and separates the received polarized white light into a plurality of component color light.

5. The double-pass projection display of claim 4,
   wherein the display has spatial light modulators and analyzers for each of the component color light, and
   wherein, during the operation of the double-pass projection display, the color separation/recombination device (i) receives modulated and analyzed component color light from each analyzer and (ii) combines the modulated and analyzed component color light into a single color light.

6. The double-pass projection display of claim 2 wherein the color separation/recombination device is a dichroic prism.

7. The double-pass projection display of claim 2 wherein the color separation/recombination device is a dichroic cube.

8. A double-pass projection display comprising:
   a. an input polarizer for receiving unpolarized white light and outputting polarized white light;
   b. a color separation/recombination device for receiving the polarized white light and separating this light into plurality of component color bands; and
   c. an image producing section for each particular component color band, each image producing section including:
      a spatial light modulator for (i) receiving from the color separation/recombination device the particular color band, and (ii) modulating the particular color band; and
      an output analyzer for (i) receiving the particular component color band modulated by the spatial light modulator, (ii) discarding light, in the particular band, that has a first polarization state, and (iii) directing light, in the particular band, that has a second polarization state to the color separation/recombination device;
   d. wherein the color separation/recombination device combines the component color bands having the second polarization state into a single color light.

9. The double-pass projection display of claim 8 wherein the color separation/recombination device is a dichroic prism.

10. The double-pass projection display of claim 8 wherein the color separation/recombination device is a dichroic cube.

11. A double-pass projection display method comprising:
    spatially modulating light;
    discarding modulated light that has a first polarization state; and
    supplying modulated light that has a second polarization to a color separation/recombination device.

12. The double-pass projection display method of claim 11 further comprising:
    supplying white light to the color separation/recombination device;
    separating the white light into plurality of component color bands by using the color separation/recombination device;
    spatially modulating each component color band;
    discarding modulated light, in each component color band, that has a first polarization state; and
    supplying modulated light, in each component color band, that has a second polarization to the color separation/recombination device.

13. The double-pass projection display method of claim 12 further comprising:
    receiving unpolarized white light;
    polarizing the white light; and
    supplying polarized white light to the color separation/recombination device.

* * * * *